United States Patent
Connor et al.

(10) Patent No.: US 9,421,455 B1
(45) Date of Patent: Aug. 23, 2016

(54) MULTIPLE USER SINGLE AVATAR VIDEO GAME INPUT SYSTEM

(71) Applicant: International Business Machines Corporation, Armonk, NY (US)

(72) Inventors: Samuel R. Connor, Apex, NC (US); Jonathan W. Jackson, Durham, NC (US); Joseph Kuczynski, North Port, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/980,145

(22) Filed: Dec. 28, 2015

Related U.S. Application Data

(63) Continuation of application No. 14/748,443, filed on Jun. 24, 2015.

(51) Int. Cl.
*A63F 13/00* (2014.01)
*A63F 13/80* (2014.01)
*G06N 3/00* (2006.01)

(52) U.S. Cl.
CPC .............. *A63F 13/00* (2013.01); *A63F 13/80* (2014.09); *A63F 2300/5553* (2013.01); *G06N 3/006* (2013.01)

(58) Field of Classification Search
CPC ................................ A63F 13/10; A63F 13/12
See application file for complete search history.

(56) References Cited

U.S. PATENT DOCUMENTS

| | | | | |
|---|---|---|---|---|
| 8,012,025 | B2 * | 9/2011 | Hillis | ...................... A63F 13/02 244/234 |
| 8,851,980 | B2 | 10/2014 | Versaci | |
| 2008/0207322 | A1 * | 8/2008 | Mizrahi | ................... A63F 13/12 463/32 |
| 2009/0141023 | A1 | 6/2009 | Shuster | |
| 2010/0045697 | A1 | 2/2010 | Reville et al. | |
| 2011/0223994 | A1 * | 9/2011 | Yerli | ........................ A63F 13/10 463/31 |

(Continued)

FOREIGN PATENT DOCUMENTS

WO     2012166072 A1    12/2012

OTHER PUBLICATIONS

Belchior, et al., "Older adults' engagement with a video game training program," http://www.ncbi.nlm.nih.gov/pmc/articles/PMC3596832/, published online Dec. 19, 2012, doi: 10.1080/01924788.2012.702307; last accessed Apr. 14, 2015 1:47 PM, 10 pgs.

(Continued)

*Primary Examiner* — Tramar Harper
(74) *Attorney, Agent, or Firm* — Robert Williams; Nolan M. Lawrence

(57) ABSTRACT

An avatar in a video game is controlled based on input from multiple users. An input composition system receives a first input from a first user. The first user uses a first input source for controlling the avatar. The input composition system receives a second input from a second user. The second user users a second input source for controlling the avatar. The input composition system alters the first input based on a first user performance modifier. The input composition system alters the second input based on a second user performance modifier. The input composition system creates an avatar input value based on the first altered input and the second altered input. The input composition directs the avatar in the video game based on the avatar input value.

1 Claim, 4 Drawing Sheets

(56) References Cited

U.S. PATENT DOCUMENTS

| | | |
|---|---|---|
| 2011/0223996 A1 | 9/2011 | Yerli et al. |
| 2012/0142429 A1 | 6/2012 | Muller |
| 2013/0155169 A1 | 6/2013 | Hoover et al. |
| 2014/0024462 A1 | 1/2014 | Qiang et al. |
| 2014/0274359 A1 | 9/2014 | Helava et al. |
| 2015/0165317 A1 | 6/2015 | Rom et al. |
| 2015/0238875 A1* | 8/2015 | Fear ................ A63F 13/847 463/33 |

OTHER PUBLICATIONS

Mubin et al., "Walk 2 Win: Towards Designing a Mobile Game for Elderly's Social Engagement," British Computer Society, pp. 11-14, © The Author 2008.

Connor et al., "Multiple User Single Avatar Video Game Input System", U.S. Appl. No. 14/748,443, filed Jun. 24, 2015.

List of IBM Patents or Patent Applications Treated as Related, Apr. 1, 2016, 2 pages.

* cited by examiner

MULTIPLE USER SINGLE AVATAR VIDEO GAME INPUT SYSTEM

BACKGROUND

The present disclosure relates to multiplayer video games, and more specifically, to directing a single avatar based on multiple users in video games.

Video games may be used for entertainment purposes, such as relaxation or competition. Video games may be used for rehabilitation purposes, such as hand eye coordination, cognitive stimulation, and physical therapy. Video games may be played by a single person or may be played by multiple people. Video games may be played on dedicated home consoles or desktop computers. Video games may be played on dedicated portable consoles or by portable computers.

SUMMARY

Disclosed herein are embodiments of a method and computer program product for manipulating control of an avatar in a video game based on input from multiple users. An input composition system receives a first input from a first user. The first user uses a first input source for controlling the avatar. The input composition system receives a second input from a second user. The second user users a second input source for controlling the avatar. The input composition system alters the first input based on a first user performance modifier. The input composition system alters the second input based on a second user performance modifier. The input composition system creates an avatar input value based on the first altered input and the second altered input. The input composition directs the avatar in the video game based on the avatar input value.

Also disclosed herein are embodiments of a system for a system of manipulating control of an avatar in a video game based on input from multiple users. A processor located within a video game console, and in communication with a memory that is also located within the video game console, receives a first input from a first user. The first user uses a first input source for controlling the avatar. The video game console receives a second input from a second user. The second user uses a second input source for controlling the avatar. The video game consoles alters the first input based on a first user performance modifier. The video game console alters the second input based on a second user performance modifier. The video game console creates an avatar input value based on the first altered input and the second altered input. The video game console directs the avatar in the video game based on the avatar input value.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
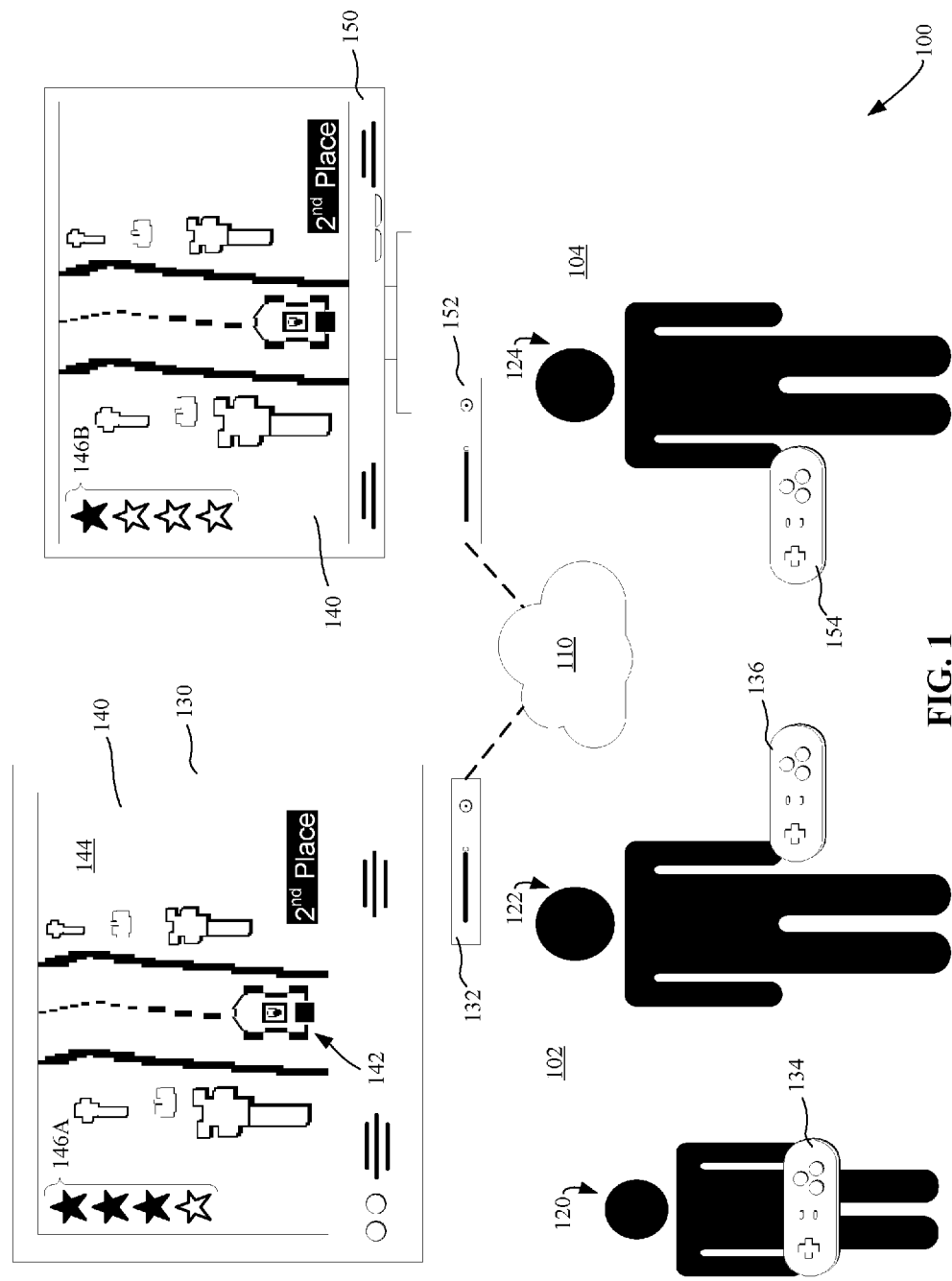
FIG. 1 depicts a multiplayer environment integrating multiple inputs from multiple users, consistent with embodiments of the present disclosure.

Aspects of the present disclosure relate to multiplayer video games, more particular aspects relate to directing a single avatar based on multiple users in video games. While the present disclosure is not necessarily limited to such applications, various aspects of the disclosure may be appreciated through a discussion of various examples using this context.

Video games (games) may have historically begun as a form of interactive entertainment for users to play in isolation. As the media of games has matured, multiplayer games (e.g., video games where multiple people play against and with each other) have come to predominate. More and more people may use video games to unwind and relax—both alone and with others. As games have become more popular, additional benefits may be seen beyond recreation.

Many groups of people may benefit from games for health reasons (e.g., young children with cognitive impairments may practice in a virtual world of a game, elderly people with decreased social connections may game together, otherwise healthy adults recovering from a traumatic incident may face their fears safely in a video game, etc.). Playing a game socially may be difficult for these people because they may be unable to control their avatar in the game successfully. The game may be too difficult for them or when playing against other people there may be too large of a skill gap. The difficulties in games that may be conventionally motivating, may in actuality cause people to withdraw from using games. The withdrawal from multiplayer gaming may cause people to suffer from social isolation. Moreover, any health benefits from playing a game may be lost because of the negative association with a lack of success.

An input composition system may enable multiple users to take joint control of a single avatar of a video game. The input composition system may determine the skill of each of the users and direct the avatar based upon those skills. The input composition system may allow for one user to control certain aspects of the avatar and a second user to control separate aspects of the avatar. The input composition system may allow a group of users that are not skilled at a video game to direct an avatar against a second avatar being controlled by a single skilled user. The input composition system may enable users in different physical locations to control the same avatar. The input composition system may allow users to provide control at different times or simultaneously to control the avatar.

Certain games incorporating the input composition system may help people stay active physically and engaged socially. For example, a group of elderly hospital patients may have reduced motor functions. The patients may also be suffering from other maladies resulting from social isolation. Physical activity in the form of a cycling game may help the rehabilitation of the patients. A cycling game incorporating the input composition system may allow the patients to compete against an elite athlete. At the beginning of the week the elite athlete may use a first instance of the cycling game through a first exercise bike at a training facility to control a first avatar through a first race.

Continuing the example, the patients may each be assigned time-slots throughout a day to use a second instance of the cycling game with a second exercise bike as the controller at a care facility to control a second avatar. A first patient may use the cycling game for twenty-five minutes during a first timeslot of a first day. The game may record the effort of the first patient. A second patient may use the cycling game for fifteen minutes during a second timeslot of the first day. Throughout the week the first patient and the second patient may use the cycling game to control the second avatar. The input composition system may aggregate the effort of the first patient and the second patient into a summation of effort. The input composition system may direct the second avatar based on the aggregation such that the second avatar is competitive with the first avatar representing the elite athlete in the first race. The combined effort may prompt the first patient and the second patient to encourage each other and socialize about the game with caretakers and other patients.

Continuing the example further, at the beginning of a second week the elite athlete may use the first instance of the cycling game to control the first avatar through a second race. The input composition system may calculate a first average effort of the first patient based on the effort of the first patient throughout the first week (e.g., the duration, the intensity, the heart-rate, etc.). The input composition system may calculate a second average effort of the second patient based on the effort of the second patient throughout the first week. The first patient may again use the second controller of the cycling game, this time to bike on the first timeslot on the first day of the second week. The input composition system may compare this new input to the first average. The first patient may provide increased effort compared to the first average. The second patient may bike on the second timeslot on the first day of the second week and the input composition may compare this second new input to the second average. The second patient may provide similar effort compared to the second average. Because of the lack of increased effort of the second patient, the input composition system may provide more control to the second avatar to the second patient (and less to the first patient). The alteration of the control of the second avatar may be shown visually to both of the patients as the second avatar falling behind the first avatar (represented by the elite athlete). This visualization may prompt the first patient to encourage the second patient to exert more effort. Throughout the second week the second patient may exert more effort and the second avatar may respond by catching up to the first avatar. At the end of the second week, the second avatar representing the first patient and the second patient may come very close to beating the first avatar (represented by the elite athlete) in the second race.

FIG. 1 depicts a multiplayer environment 100 integrating multiple inputs from multiple users, consistent with embodiments of the present disclosure. The environment may include a first physical location 102 (e.g., a home) and a second physical location 104 (e.g., a hotel room) connected through a network 110 (e.g., the Internet). In the first physical location 102, a child 120 may be taken care of by a babysitter 122. In the second physical location 104, a mother 124 of the child 120 may be working at a conference located near the second physical location.

In location 102, there may also be a first television 130 and a first video game console 132 (first console) electronically coupled to the first television. Coupled to the first console 132 may be a first controller 134 and a second controller 136. The first console 132 may be playing a car racing video game 140 (car game). The car game 140 may be displayed by the first television 130. The car game 140 may display an avatar 142 (e.g., a formula racing car) in a game-world 144 (e.g., a racetrack). The child 120 may utilize the first controller 134 to send input to the first console 132 and the first console 132 may manipulate the avatar 142 in response to the child's inputs. The child 120 may request assistance from the babysitter 122 and the babysitter may use the second controller 136.

The first console 132 may execute an input composition system (not depicted) to integrate the input from the first controller 134 and the second controller 136. The input composition system may be executed at an application level. The input composition system may be executed at a system or hypervisor level. In some embodiments, the input composition system may be executed by a server (not depicted) connected to the first console 132 by the network 110. In some embodiments, some elements of the input composition system may be executed by the first console 132 and other elements of the input composition system may be executed by the server.

The child 120 may be recognized by the input composition system based upon user profiles stored on the first console 132. The child 120 may be recognized by his input to the first controller 134. The input composition system may recognize his input based on capabilities of the first controller 134 (e.g., the timing of input to a digital controller, the duration of input to a digital controller, the force of input to an analog controller, the degree of input to an analog controller, etc.). The child 120 may provide his skill level to the input composition system directly (e.g., selecting a profile representative of the child, choosing a "novice skill level", etc.). The child 120 may provide his skill level to the input composition indirectly (e.g., by playing the car game 140 and having the console learn his skill level by evaluating the quality of his play).

The babysitter 122 may pause the car game 140 and join play by using the second controller 136. The babysitter 122 may be recognized by the input composition system based upon the babysitter selecting a specific user profile on the first console 132. The babysitter 122 may use the controller to select the skill level of himself and the child 120. The input composition system may receive, alter, and generate input to the car game 140 based on the relative skill levels of the child 120 and the babysitter 122. In detail, the input composition system, after receiving input from the child 120 and the babysitter 122, may alter the input of the child 120 and the babysitter 122 based on the setting selected by the babysitter. For example, the input composition system may assign the input for steering for the child 120 to forty-five percent of the avatar 142 input and may assign the input for steering from the babysitter 122 to fifty-five percent of the avatar input, respectively. The input composition system may assign the input for acceleration and braking of the avatar 142 to an average of the input from the child 120 and the input from the babysitter 122. The input composition system may perform interpolation to smooth large variations between the input from the child 120 and the input from the babysitter 122 (e.g., further refine an average to be closer to an optimum input).

As the child 120 and the babysitter 122 play the car game 140, the input composition system may grade their performances (e.g., how accurate the inputs are in relation to the input required to properly manipulate the avatar 142, how accurate the inputs are in relation to each other, how accurate the inputs are in relation to past performances). The input composition system may reassess the skill (if, for example, it detects that the child 120 is improving in relation to the babysitter 122), such as by adjusting (or re-assigning) input for steering to fifty percent for the child and fifty percent for the babysitter.

The mother 124 may arrive after work at the second location 104 and join the car game 140 being displayed on a second television 150. A second video game console 152 (second console) may be connected to the first console 132 to display the car game 140 through the network 110. The mother 124 may provide input to the car game 140 through a third controller 154. The input composition system may recognize the mother 124 when the second console 152 connects to the first console 132. The second console may again alter the input to the avatar 142 in the car game 140, this time in response to the mother 124 connecting. The mother 124 may have a much higher skill than the child 120 and the babysitter 122 and the input composition system may assign control based upon the higher skill (e.g., sixty percent of steering to the mother 124, twenty percent of steering to the babysitter 122, and twenty percent of steering to the child 120). In another example, one or more inputs of braking from the babysitter 122 and the child 120 may be ignored (e.g., assign zero percent to the value). In some embodiments, the input composition system may override the assignment of skills. For example, the mother 124 may look away from the car game 140 and miss a turn. Both the input from the child 120 and the babysitter 122 may override the sixty percent steering bias to successfully navigate the game-world 144 of the car game 140.

The car game 140 may provide an indicator 146A and 146B (collectively, 146) to illustrate the amount of control assigned to the users 120, 122, and 124. For example, the indicator 146A may indicate that the child 120 and the babysitter 122 have a low amount of control over the car game 140. The indicator 146B may indicate that the mother 124 has a high amount of control over the car game 140. The babysitter 122 may put down the second controller 136 to make dinner for the child 120, while the child 120 and the mother 124 continue to play. The game may yet again assess the skill of the players and may detect that the second controller 136 has been put down. The game may yet again also alter the input to the avatar 142 such that input from only first controller 134 and the third controller 154 affect the car game 140. The mother 124 may help the child 120 compete with and may beat other users (not depicted) controlling other avatars (not depicted). The performance of the avatar 142 may be recorded as controlled by the child 120 to share through the first console 132 to friends.

Figure 2:
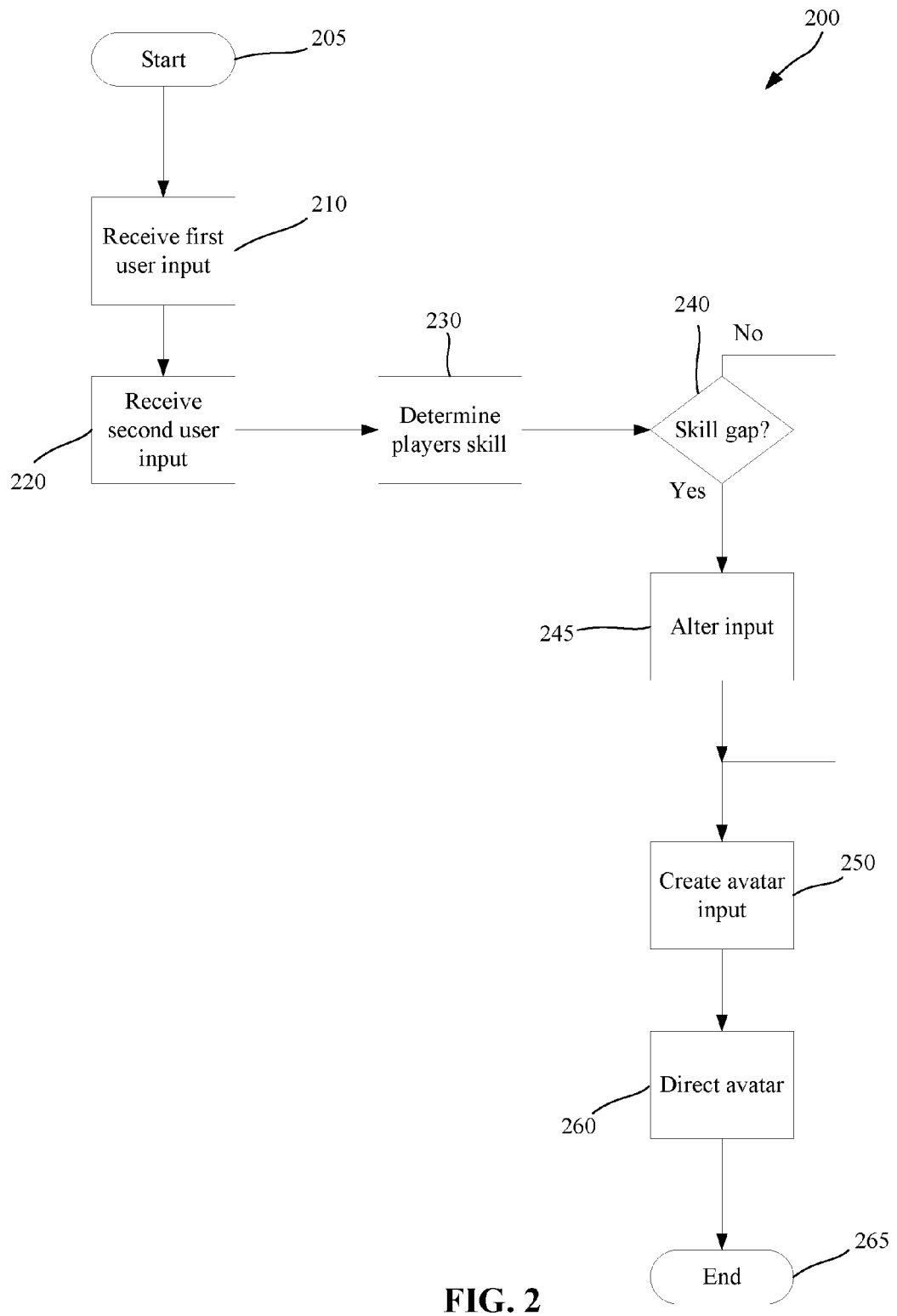
FIG. 2 depicts an example method for integrating input from multiple players into one avatar of a game, in accordance with embodiments of the present disclosure.

FIG. 2 depicts an example method 200 for integrating input from multiple players into one avatar of a game, in accordance with embodiments of the present disclosure. For example, the game may be a musical band simulation game (band game) and the avatar may be a lead guitarist (guitarist) of the band in the band game. Method 200 may be executed by the game, or by one or more video game consoles running the game. In some embodiments, method 200 may be executed simultaneously by multiple devices, such as by some steps being executed by a first video game console and other steps being executed by a game server running in a datacenter. Method 200 may include more or less steps than those depicted. Method 200 may be executed many times rapidly (e.g., every sixteen milliseconds, every ten milliseconds).

From start 205, the band game may receive user input from a first player at 210. The input may be received at 210 from a first controller (e.g., a first guitar controller). At 220 the band game may receive user input from a second player from a second controller (e.g., a second guitar controller). The input received at 210 and the input received at 220 may be directed at the same avatar. For example, the first player may be a husband playing the band game with his wife and their daughter. The husband may control the guitarist with the first controller. The wife may control the guitarist with the second controller. The daughter may be playing with a third controller (e.g., a drum controller) controlling a second avatar (e.g., the drummer).

At 230 the band game may determine the skill of the players that are controlling the same avatar. The skill may be determined at 230 by comparing the input from the players against their respective past performance (e.g., comparing the husband to past performance of the husband, comparing the wife to past performance of the wife). The skill may be determined at 230 by analyzing the attributes of the input devices, such as the timing, force, and duration from the first guitar controller and the second guitar controller. The skill may be determined at 230 by comparing the attributes of the input devices against a model input (e.g., comparing the actual timing, force, and duration inputs to optimal inputs, such as those required to achieve a perfect score, achieve a good rating, or pass the level). At 230 a first skill may be determined for the husband and a second skill may be determined for the wife. One or more rankings may be assigned when the skill of the players is determined at 230. In a first example, the husband may be taking a phone call and the wife may be focusing. The band game may assign the husband a ranking of two out of five and the wife a ranking of four out of five.

At 240 the band game may determine if there is a gap in skill between the first player and the second player. The game may determine there is a difference in skill, at 240, by determining that the rankings of the players are different from each other. The game may determine there is a difference in skill, at 240, if the skill of the players are more than a threshold value from each other (e.g., a first player has a ten percent more correct input than a second player). If there is a skill gap detected, at 240, then the band game may alter input of the players at 245. The band game may alter input, at 245, by reducing or increasing the weight or relevance of one or more of the players. Continuing the first example, there may be a gap in skill detected at 240 because the husband may have a worse ranking than the wife. The husbands input may be altered, at 245, by applying some mathematical formula to his input (e.g., by dividing his input by two, by multiplying his input by one tenth, etc.).

After altering the input of the players, at 245, the band game may create avatar input (e.g., input for the lead guitarist) at 250. The avatar input may be created at 250, in some embodiments, by averaging the input of the players after they were altered at 245. The avatar input may be created by selecting one of the two inputs after they were altered at 245. The avatar input may be created at 250 by aggregating various components of the first player and the second player. For example, the strumming of the first guitar controller and the chord buttons of the second guitar controller may be used for the guitarist at 250. If the game determined there was no skill gap, at 240, the band game may create avatar input differently at 250. If there was no skill gap found, at 245, the game may create avatar input at 250 by averaging the unaltered input of the first and second player received at 210 and 220, respectively. After creating avatar input at 250 the band game may direct the avatar based on the avatar input at 260, and end at 265.

In a second example of the band game that executes method 200, husband and wife may again control the lead guitarist with a first controller and a second controller. Again the daughter may control the drummer with a third controller. At 210 the band game may receive the input from the husband, and at 220 the band game may receive the input from the wife. During gameplay, the wife may need to use the restroom and the husband may be talking on the phone. The wife may ask the husband to focus on the game while she takes a break and the husband may end the phone call and focus on the band game. The game may determine the skill of the wife after putting the second controller down, at 230, by assigning a ranking to the wife of zero out of five. The game may determine the skill of the husband after focusing, at 230, by assigning a rank to the husband of four out of five. At 240 the band game may determine there is a skill gap between the husband and wife, and may alter the input of the wife by ignoring her input (or lack thereof) at 245. At 250 the game may use the input of the husband and not the input of the wife to create control for the lead guitarist. Thus, the band game may direct the avatar at 260 and the game may continue while the husband takes control of the guitarist for the wife. The band game may then be played with the daughter without pausing the game, which may interrupt flow, or without losing any points for the guitarist.

Figure 3:
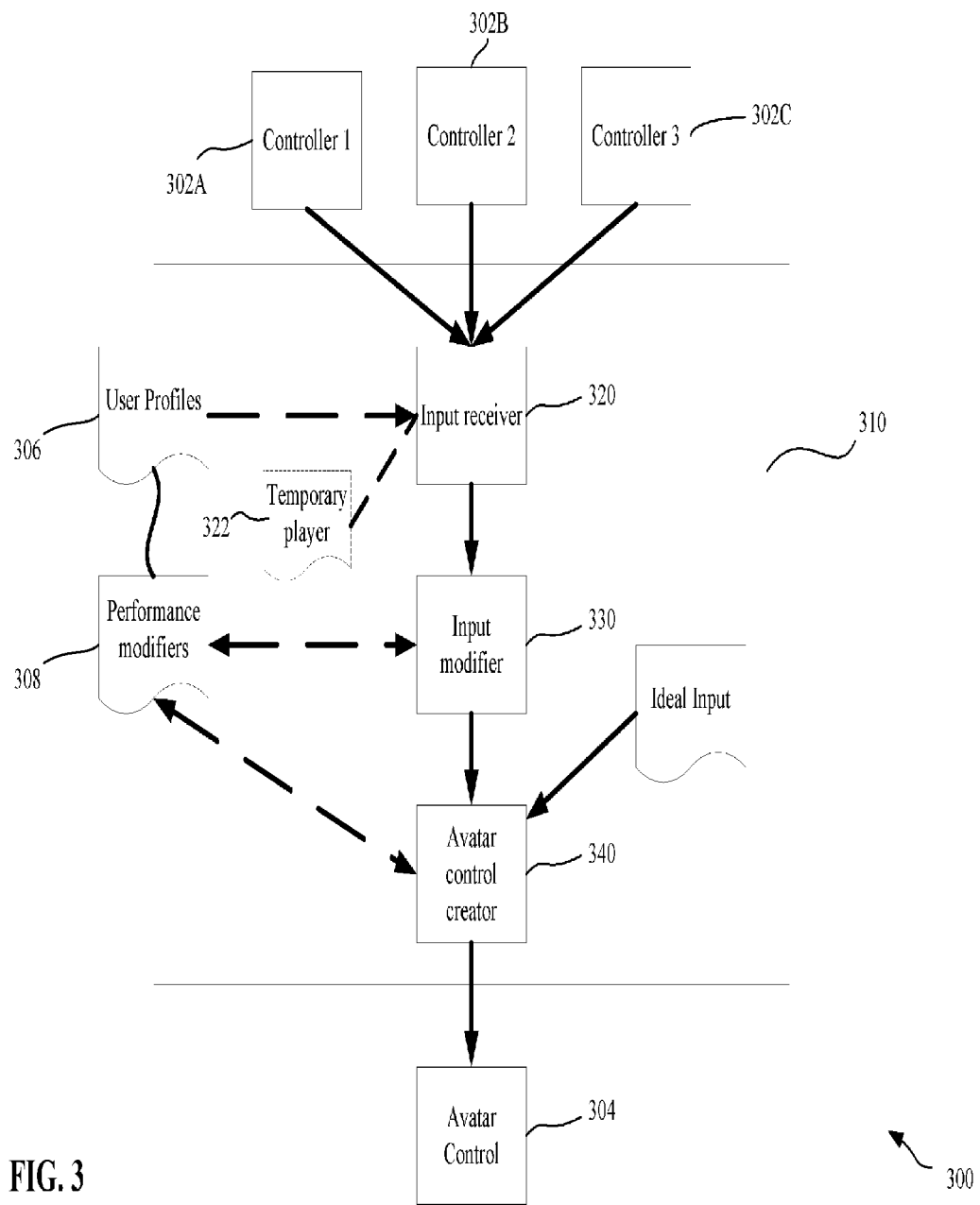
FIG. 3 depicts the input subsystem of a game engine utilizing an input composition system in accordance with embodiments of the present disclosure.

FIG. 3 depicts the input subsystem 300 of a game engine utilizing an input composition system 310 in accordance with embodiments of the present disclosure. The input subsystem 300 may be a subsystem of a game engine and may receive controller input from multiple controllers 302A, 302B, and 302C (collectively, 302). In some embodiments, the input subsystem 300 may receive controller input from more or less controllers than those depicted. The input subsystem 300 may also take the input from one of the controllers 302 and direct or control an avatar through the avatar control 304, based upon the input. The avatar may move in response to the avatar control 304 in a game generated by the game engine.

The input subsystem 300 may associate one of the controllers 302 with a user by way of a stored list of user profiles 306. The user profiles 306 may contain play history of users from the game (e.g., high scores, accuracy of performance, a player rating that represents the skill of the player, achievements the player has completed, etc.). The input composition system 310 may reference a list of performance modifiers 308. The list of performance modifiers 308 may be stored by the input subsystem 300 or by another subsystem of the game engine. In some embodiments, the list of performance modifiers 308 may be associated with the list of user profiles 306, such that each user profile (representing a specific user) has a distinct performance modifier. The list of performance modifiers 308 may be created by the users (e.g., a user may specify that they are not good at the game and an entry into the list of performance modifier may indicate that they should have less control over the game).

The input composition system 310 may include the following: an input receiver 320, an input modifier 330, and an avatar control creator 340. The input receiver 320 may retrieve the input from the users from the controllers 302. The input system 300 may have associated the input from the controllers 302 with a user. For example, a first user may use the first controller 302A to select a first user profile corresponding to the first user from the list of user profiles 306. The input receiver 320 may associate the user profiles in the list of user profiles 306 with the controllers 302 (e.g., by assigning both each controller and user profile with a unique identifier).

If the input from one of the controllers does not match any of the user profiles 306, the input receiver 320 may create a temporary profile 322.

The input modifier 330 may take the associated user input from the input receiver 320 and apply a performance modifier from the list of performance modifiers 308. The performance modifier may amplify or reduce the amount of input a user input may receive. For example, the input may have an unaltered value in the range of '1'-'9'. A performance modifier may be one-hundred percent of the input '9', and the altered input from the input modifier 330 may be '9'. A performance modifier may be thirty-three percent of the input '9', and the altered input from the input modifier may be '3'. A performance modifier may be one half of the input '9', and the altered input from the input modifier may be '5'.

The avatar control creator 340 may generate a single control signal from the altered inputs of the input modifier 330. The avatar control creator 340 may generate the control signal by averaging the altered inputs from the input modifier 330. The avatar control creator 340 may generate the control signal by assigning differing activities of the avatar to different altered inputs (e.g., controller 302A may be assigned steering, and controller 302B may be assigned acceleration and braking). The assignment of differing activities may be done by the avatar control creator 340 to increase or decrease the difficulty of the game for the users. The avatar control creator 340 may need to do some interpolating to smooth the values of the altered inputs if they vary by too much. For example, a first input is '1' at a first time and is '100' at a second time, the avatar control creator 340 may ignore one of the inputs or average the first input at the first time and the second input at the second time. The avatar control creator 340 may generate the control signal by comparing the altered inputs with an ideal input that a computer controlled player may input. For example, a first user uses controller 302A to provide a first input value of '127' and a second user uses controller 302B to provide a second input value of '147' and the computer controlled player provides an input value of '180', the avatar control creator 340 may ignore the first input value and utilize the second input value.

The avatar control creator 340 may override the alteration of the inputs that were performed by the input modifier 330 by accessing the list of performance modifiers 308. For example, a steering value has a range of '0'-'255' indicating left to right steering in a racing game ('0' for maximum left steering, '255' maximum right steering, and '125'-'130' indicating no steering). In a first turn, a computer controlled player performed a perfect turn by providing a steering value of '175'. A first user input a value of '190' and a second user input a value of '182'. Based on the list of performance modifiers 308, the input modifier 330 gave a lower weighting to the first user input and the second user input. The third user input a value of '85' and the input modifier 330 gave a higher weighting to the third user input based on the list of performance modifiers 308. The avatar control creator 340 might average the inputs to create the avatar input as follows: (190*0.20+ 182*0.20+85*0.60)=125.4.

The avatar control creator 340 may individually compare the values of user inputs individually to the value of the computer controlled player to detect a false input or to remove bias inputs. Based on the comparison the avatar control creator 340 may determine that the steering value from the third input is beyond a threshold, and is not relevant. The threshold may be the standard deviation of the steering values '190', '182', and '85' (i.e., '47.7'). If the avatar control creator 340 determines that the third input is beyond the threshold, the avatar control creator may override that input and average the first and second input.

Figure 4:
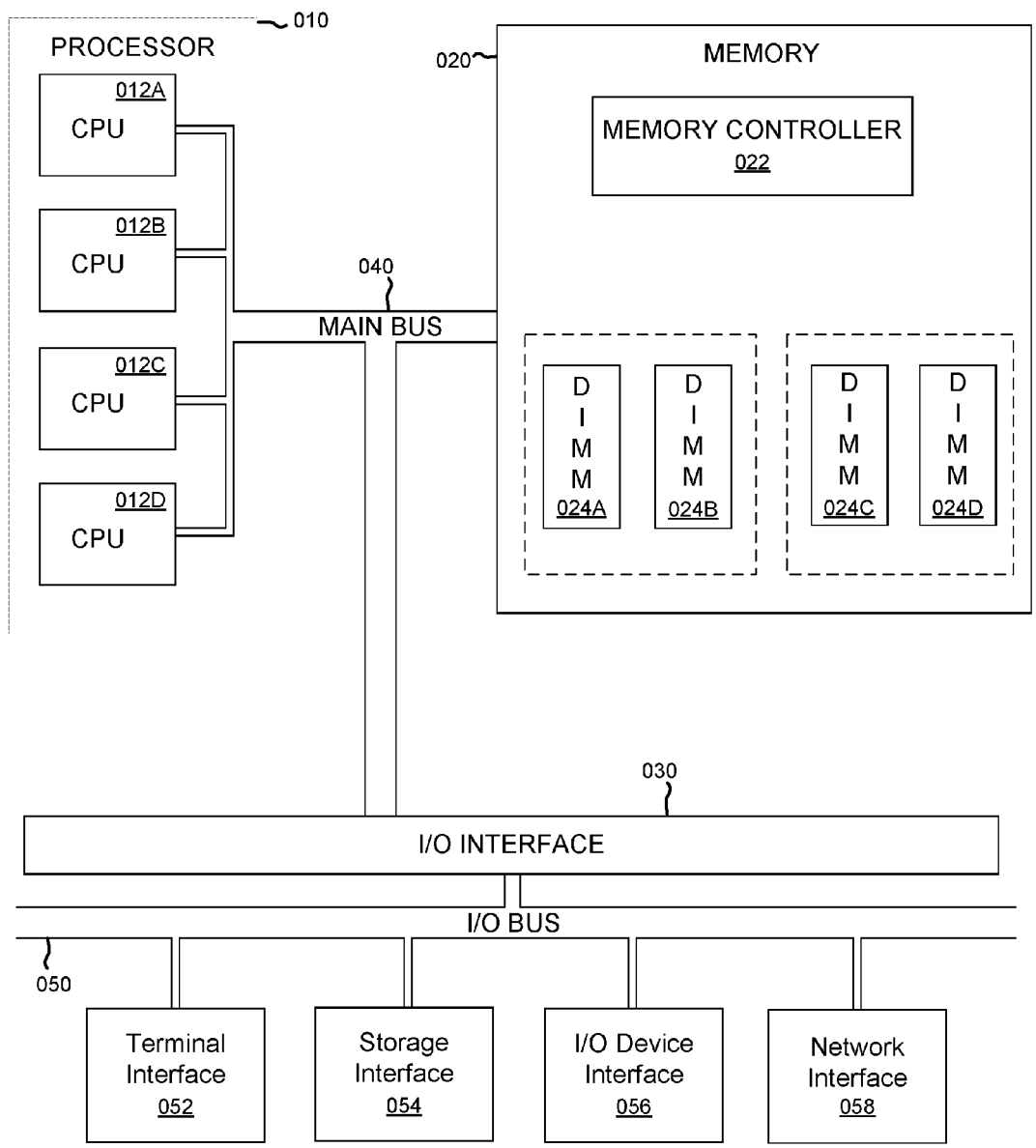
FIG. 4 depicts the representative major components of an exemplary computer system that may be used, in accordance with embodiments of the disclosure While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

FIG. 4 depicts the representative major components of an exemplary computer system 001 that may be used, in accordance with embodiments of the disclosure. It is appreciated that individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted).

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. The CPUs 012 may be comprised of one or more circuits configured to perform one or methods consistent with embodiments of the invention. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules or DIMMs.

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 020 to the various interfaces of the I/O bus 050. The I/O interface 030 may also direct instructions and data from the various interfaces of the I/O bus 050 to the processor 010 and memory 020. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001—including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for manipulating control of an avatar in a video game based on input from multiple users, the video game being executed by a processor of a video game console, the method comprising:

receiving, by the processor, a first input from a first user, the first user using a first input source for controlling the avatar in the video game;

receiving, by the processor, a second input from a second user, the second user using a second input source for controlling the avatar in the video game;

comparing, by the processor, the first input to an ideal input, wherein the ideal input is based on an input that a computer controlled user would provide to cause the avatar to perform a perfect result in the video game;

comparing, by the processor, the second input to the ideal input;

ignoring, by the processor and based on the first compared input and the second compared input, one of the first input or the second input; and directing, by the processor and based on the other of the first input or the second input, the avatar in the video game.

* * * * *